(12) United States Patent
Braun et al.

(10) Patent No.: US 6,437,324 B1
(45) Date of Patent: *Aug. 20, 2002

(54) TIMING RULER OR TIMING DISK AND PROCESS FOR ITS MANUFACTURE

(75) Inventors: Paul Wilhelm Braun, Troisdorf; Jochen Rückert, Seebach, both of (DE)

(73) Assignee: PWB - Ruhlatec Industrieprodukte GmbH, Seebach (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,701

(22) Filed: Oct. 29, 1999

(30) Foreign Application Priority Data

Dec. 23, 1998 (DE) .......................... 198 60 106

(51) Int. Cl.⁷ .............................. G01D 5/34; G01D 5/36
(52) U.S. Cl. .................... 250/231.14; 250/233
(58) Field of Search ................ 250/230, 233, 250/231.14; 356/25, 28; 341/13, 31; 235/454, 470

(56) References Cited

U.S. PATENT DOCUMENTS

| | | | | |
|---|---|---|---|---|
| 4,644,156 A | * | 2/1987 | Takahashi et al. | 430/321 |
| 4,731,638 A | * | 3/1988 | Cherian | 399/78 |
| 4,816,362 A | * | 3/1989 | Takeda et al. | 430/14 |
| 5,508,088 A | * | 4/1996 | Braun | 428/195 |
| 5,672,865 A | * | 9/1997 | Braun | 250/233 |
| 5,828,047 A | * | 10/1998 | Ruckert | 235/462.27 |
| 5,882,760 A | * | 3/1999 | Hatwar et al. | 428/64.1 |

FOREIGN PATENT DOCUMENTS

| | | |
|---|---|---|
| CH | 681 742 | 5/1993 |
| DE | 44 29 892 | 3/1995 |
| DE | 295 04 883 | 7/1995 |
| DE | 295 04 883 | 8/1995 |
| DE | 196 50 690 | 6/1998 |
| EP | 0 385 418 | 9/1990 |

* cited by examiner

Primary Examiner—Stephone Allen
Assistant Examiner—Eric Spears
(74) Attorney, Agent, or Firm—Collard & Roe, P.C.

(57) ABSTRACT

The present invention relates to a timing ruler or a timing disk for the exact positioning of working machines, servomotors, encoders or the like. The device consists of a transparent material on which codings are arranged for scanning via optical sensors. The transparent material consists of a film supporting on one side a light-sensitive layer. The light-sensitive layer is provided via masks or photoplotters with codings for producing windows. The light-sensitive layer is covered with a transparent thermally stable and moisture-resistant material. The invention also relates to a process for the manufacture of such a timing ruler or such a timing disk.

10 Claims, 4 Drawing Sheets

TIMING RULER OR TIMING DISK AND PROCESS FOR ITS MANUFACTURE

BACKGROUND OF THE INVENTION

1. Field of the Invention

The present invention relates to a timing device, namely a timing ruler or a timing disk for the exact positioning of working machines, servo-motors, encoders or the like, consisting of a transparent material on which codings are arranged for scanning via optical sensors; as well as to a process for its manufacture.

2. The Prior Art

Timing rulers or timing disks of the type specified above are known from DE 295 04 883 U1. As a rule, the timing disks are secured on a rotating axle, for example of an encoder. A beam of light generates pulses by the transmitted-light method when the disk is rotating. The light source is disposed in this connection parallel with the axis of rotation and transmits a beam of light onto the disk at a right angle.

The sequence "permeable to light/impermeable to light" preset on the coded timing disk produces on the rotating disk "window" openings of a defined width and length, which are used for generating pulses. The beam of light exiting from a light source (emitter) is converted by a receiver (optical sensor) disposed in the optical axis of the beam of light into a pulse, whereby the accuracy of the pulse is dependent upon the quality of the "windows".

The timing disks or timing rulers mentioned above have been successfully applied in practical life. However, in certain application cases, for example in a moist atmosphere or at temperatures above 100° C., problems sometimes arise, because the film may delaminate and/or soften under such circumstances, so that the accuracy of the measurement suffers.

On the other hand, timing disks or timing rulers have been manufactured from glass, metal, or thermally stable plastic. However, such timing disks are costly both on the material side and with respect to the manufacturing process, and, furthermore, do not offer the required accuracy which, for example, is part of the standard preconditions that need to be satisfied in the field of application of encoders.

Therefore, the problem of the present invention is to further develop a timing disk or timing ruler of the type specified above in such a way that such timing disks or rulers can be employed without limitations also in a moist atmosphere and in particular at temperatures in excess of 100° C. The goal in this connection is also to dispense with the use of expensive materials and to make the manufacturing process suitable for mass production operations with an output of more than 100,000 units per day.

SUMMARY OF THE INVENTION

This problem is solved by the timing device and process for its manufacture according to the invention. It has now been found that by covering the exposed and developed film material with a foil and by selectively sealing the edges, it is possible to produce a timing ruler/timing disk which is thermally stable and resistant to moisture under the aforementioned conditions. The film material serving as the base of the timing ruler/timing disk is a standard film material with a photolayer preferably having a reflecting coating on one side. After the transmitter and the receiver, i.e. the light source and the optical sensor have been combined in one chip, the components can be arranged as an assembly on one side of the timing ruler or timing disk. Scatter and diffraction of the light rays can be reduced and phenomena of interference can be avoided owing to the low layer thicknesses.

Both the metal layer and the transparent light-sensitive layer are preferably coated with a protective layer. Such a protective layer may consist of a foil laminated to the element, such a foil made of plastic, for example polypropylene or polyethylene. The stability of the timing disk is substantially enhanced by such a protective layer.

The edges of the timing ruler or timing disk are advantageously sealed. This is explained in the following in greater detail with the help of a number of exemplified embodiments.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawings.

DETAILED DESCRIPTION OF PREFERRED EMBODIMENTS

Figure 1:
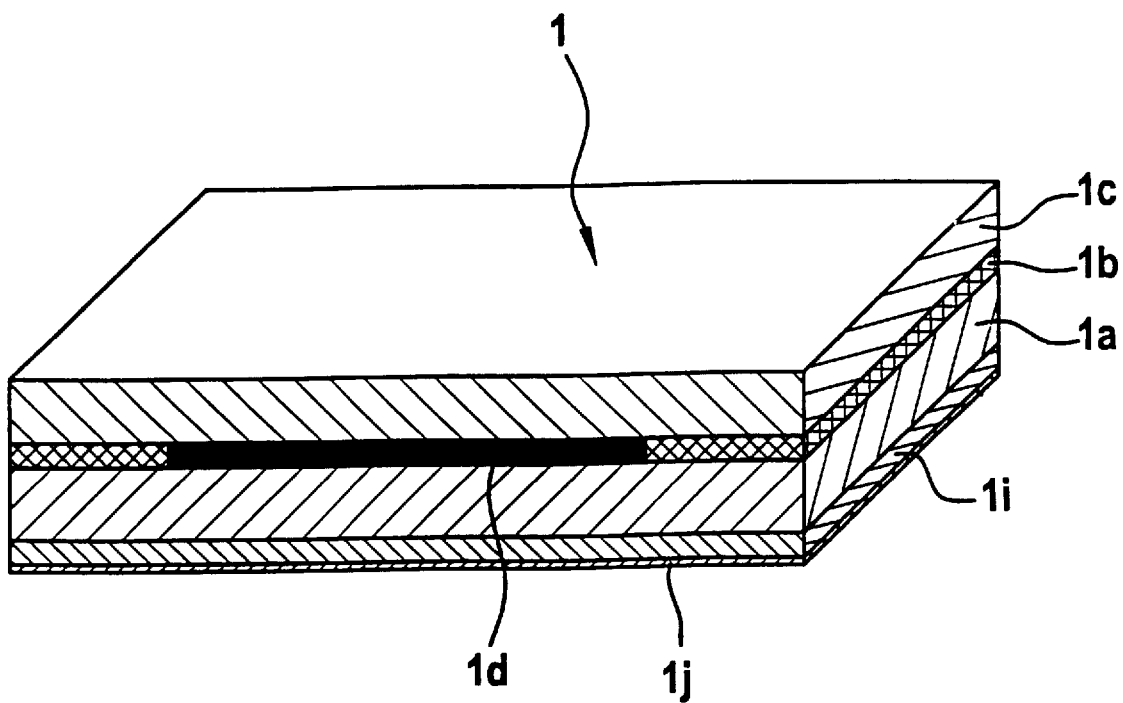
FIG. 1 shows the basic structure of a timing ruler/timing disk as defined by the invention.

Turning now in detail to the drawings, in FIG. 1, the timing disk is denoted by reference numeral 1. Disk 1 consists of a film material 1a, a photoemulsion layer 1b and a foil 1c laminated to photoemulsion layer 1b.

Following exposure and development, the code markings 1d are visible as a black coloration.

Figure 2:
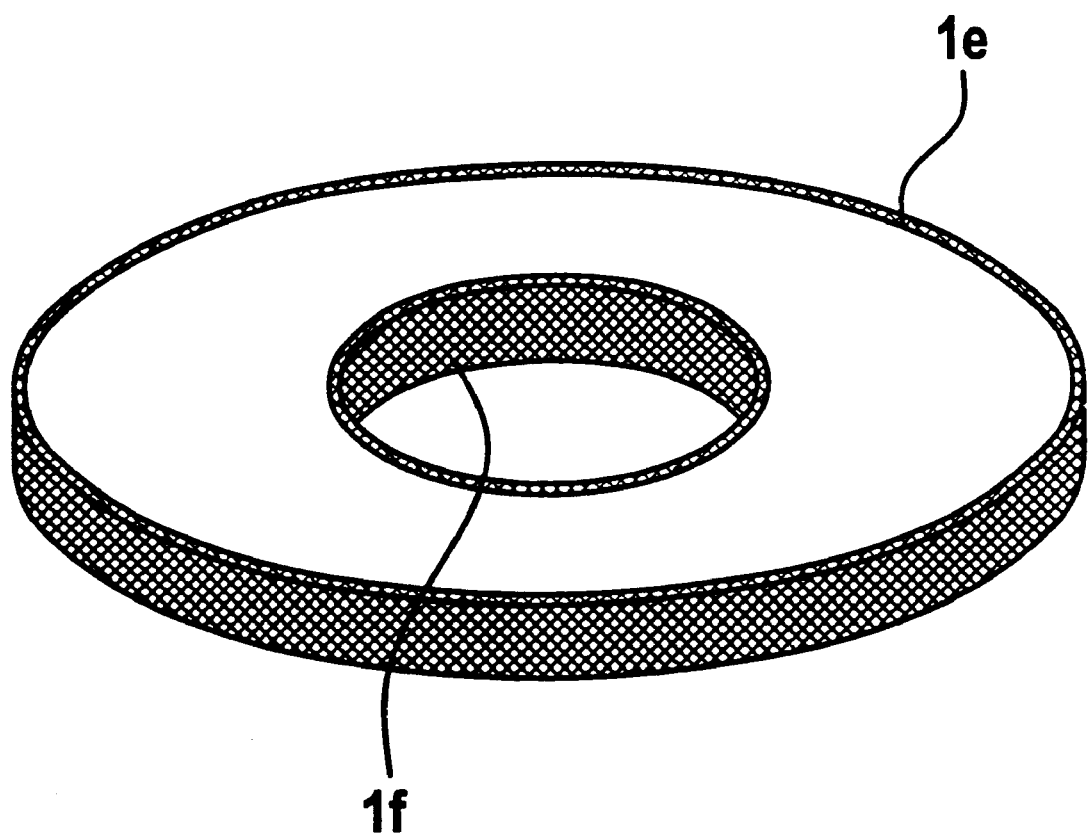
FIG. 2 shows the sealing of a timing disk as defined by the present invention.

In FIG. 2, a timing disk singled or punched from the timing disk material according to FIG. 1 is shown in the form of a ring body. On the outer circumference 1e, the timing disk supports a sealing and preferably also a sealing for covering the wall 1f of the annular bore. The sealing can be applied to the interfaces also with a hot setting lacquer alone or jointly with another adhesive.

Figure 3:
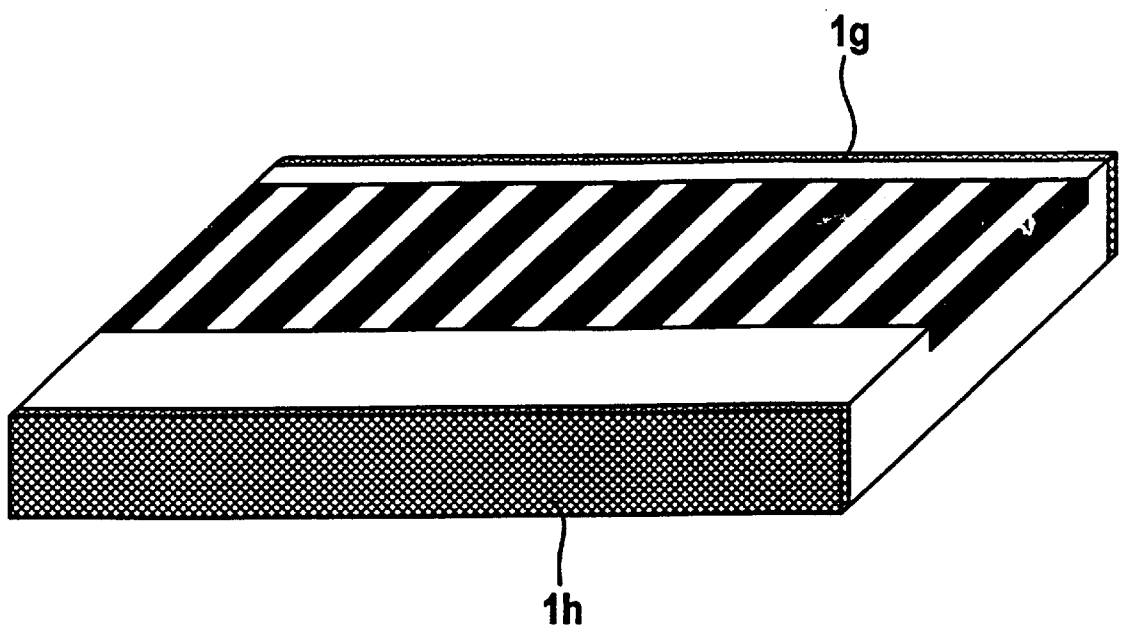
FIG. 3 shows a timing ruler as defined by the invention with a lateral sealing.

FIG. 3 shows a section of a timing ruler, whereby the cutting edges 1g and 1h are sealed against moisture with a sealing. The purpose of this sealing is to protect the light-sensitive layer against influences of moisture. Metallic layers naturally can be protected against corrosion by a sealing as well.

Figure 4:
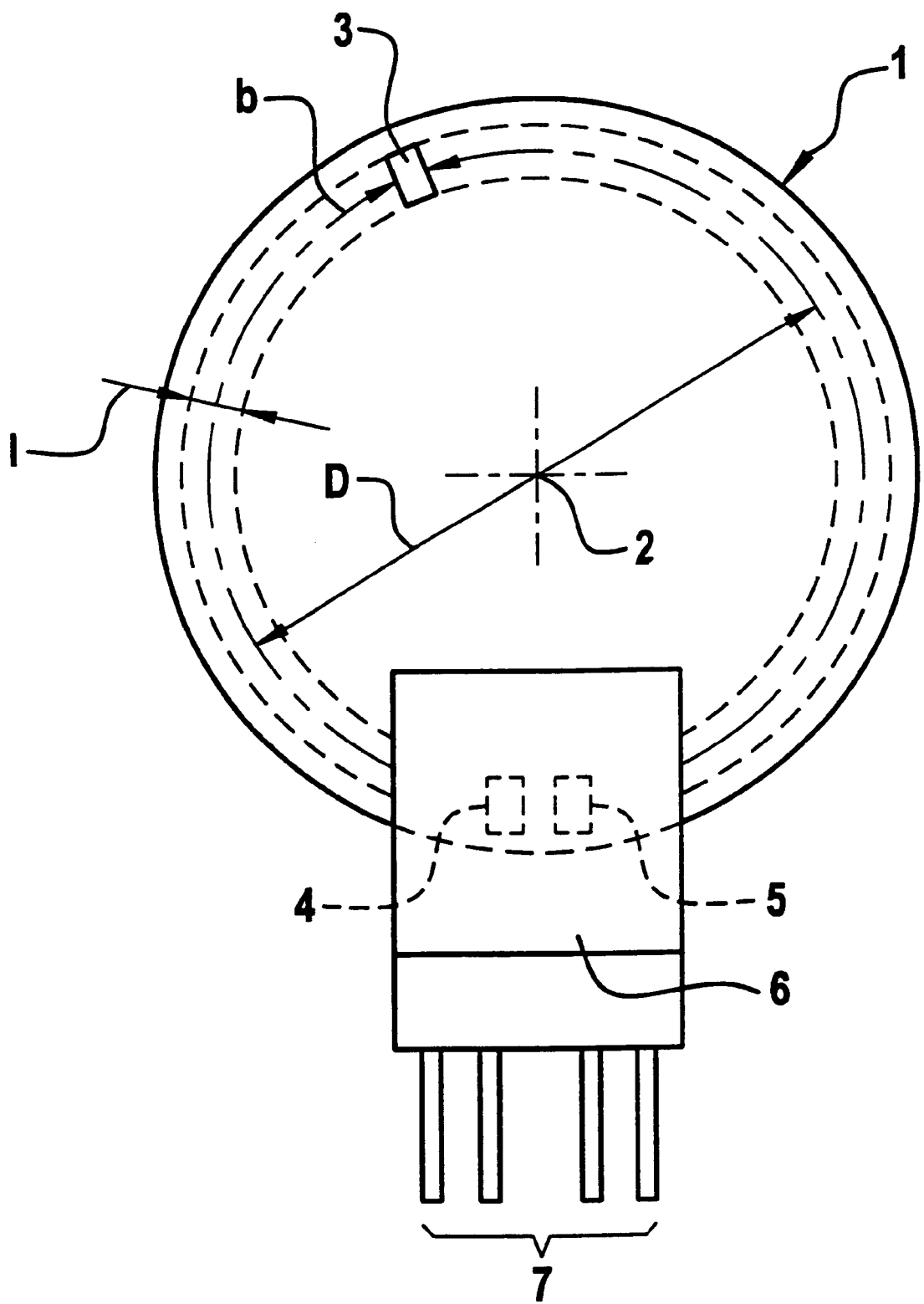
FIG. 4 shows a top view of the timing disk as defined by the invention with a transmitter/receiver.

FIG. 4 shows the basic structure of a timing disk as a component of an encoder. Timing disk 1 supports a diameter 4 (optical diameter) and revolves around an axis of rotation 2. Slots or code markings 3 are arranged on its outer circumference, the markings having a slot length l and a slot width b.

According to the exemplified embodiment shown in FIG. 1, the film material 1a employed as carrier material is directly joined with a photolayer or gelatine layer 1b. Additional adhesive materials are specifically dispensed with.

A transmitter 4 and a receiver 5 each are located on the outer edge of timing disk 1 and arranged on a common functional unit 6. The transmitter and the receiver are connected via lines 7 to a control circuit (not shown).

If a reflecting layer 1i as shown in FIG. 1 is additionally arranged on the film material, the light rays emitted by transmitter 4 are reflected only on the passage slots of the photolayer, i.e. between the slots of the mask, and registered by the receiver 5, which transmits a pulse to the control circuit via line 7.

In order to avoid minute signal differences it is necessary that any irregularity of the timing disk or timing ruler is avoided. Such irregularity may occur also in the presence of diffraction phenomena of the beam of light emitted by transmitter 6. Therefore, it is advantageous if the spacing between the layers traversed by the light beam upon reflection is minimized. The thickness of foil 1c is therefore preferably less than the thickness of film material 1a. So-called "thin-layer methods" can be employed for the application of metallically highly reflective coatings with a degree of reflection of greater than 90°. Such methods can be realized, for example by using the sputtering technology. It has been found based on tests that metal layers consisting of copper, aluminum, chromium and silver can be advantageously applied with the help of a light source emitting light waves with a wavelength of about 700 nm. The arrangement of the reflecting layer is described in DE 44 29 892 A1. As shown in FIG. 1, the metal layer 1i supports an additional protective layer or sealing 1j which protects against mechanical damage.

The process as defined by the invention permits the mass production of articles of the present type with high resolution. In addition, it offers the benefit of high process safety because film material with constant properties is employed in the manufacture of the timing disks.

Accordingly, while a few embodiments of the present invention have been shown and described, it is to be understood that many changes and modifications may be made thereunto without departing from the spirit and scope of the invention as defined in the appended claims.

What is claimed is:

1. A timing device comprising a transparent material on which codings are arranged for scanning via optical sensors, said transparent material consisting of
    (a) a film;
    (b) a light-sensitive gelatine layer supported by the film on one-side of said film, said light-sensitive layer being provided with said codings for producing windows; and
    (c) a transparent, thermally stable and moisture-resistant material covering the light-sensitive layer;
    wherein the timing device has sealed edges.

2. The timing device according to claim 1, further comprising a transmitter located on one side of the timing device and a reflecting layer arranged on the side of the timing device facing away from the transmitter.

3. The timing device according to claim 2, wherein the reflecting layer is a metal layer applied by a thin-layer method.

4. The timing device according to claim 3, wherein the metal layer consists of copper, aluminum, chromium or silver.

5. The timing device according to claim 1, wherein the thermally stable and moisture-resistant material consists of a plastic foil.

6. A process for producing a timing device comprising:
    (a) providing a film material and a light-sensitive gelatine layer supported on one side of the film material;
    (b) exposing and subsequently developing the light-sensitive layer to provide codings on the layer for scanning by optical sensors;
    (c) laminating a foil to the developed layer;
    (d) cutting the exposed and laminated film material to form an individual timing device body having cut edges; and
    (e) sealing the cut edges with a hot setting lacquer to form the timing device.

7. The process according to claim 6, further comprising providing the exposed and developed film material with a reflecting layer by a thin-layer process.

8. The timing device according to claim 3, further comprising a protective layer protecting against physical damage supported on said metal layer.

9. The timing device according to claim 1 wherein the timing device takes the form of a ring body comprising an outer circumference and an annular bore having a wall, said outer circumference and said wall being covered by a hot setting lacquer.

10. The timing device according to claim 1 wherein a hot setting lacquer seals the edges of the timing device.

* * * * *